United States Patent
Ng et al.

(10) Patent No.: US 8,284,080 B2
(45) Date of Patent: Oct. 9, 2012

(54) SYSTEM AND METHOD OF SCANNING AN ARRAY OF SENSORS

(75) Inventors: Chee Yu Ng, Singapore (SG); Giuseppe Noviello, Singapore (SG); Eng-Siong Goh, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 898 days.

(21) Appl. No.: 12/340,030

(22) Filed: Dec. 19, 2008

(65) Prior Publication Data

US 2009/0185062 A1    Jul. 23, 2009

(30) Foreign Application Priority Data

Dec. 19, 2007 (SG) ................. 200718899-8

(51) Int. Cl.
    *H04N 5/35* (2006.01)
(52) U.S. Cl. ............... 341/26; 341/20; 341/21; 341/22; 341/23; 345/173
(58) Field of Classification Search ............ 341/20, 341/22, 26; 345/173
See application file for complete search history.

(56) References Cited

U.S. PATENT DOCUMENTS

| | | | |
|---|---|---|---|
| 4,103,252 A | | 7/1978 | Bobick |
| 4,300,127 A | * | 11/1981 | Bernin ............... 341/32 |
| 5,463,386 A | * | 10/1995 | Wu ................... 341/26 |
| 5,648,642 A | * | 7/1997 | Miller et al. ........ 178/18.06 |
| 5,798,750 A | | 8/1998 | Ozaki |
| 5,805,085 A | * | 9/1998 | Hsu et al. ........... 341/26 |
| 5,982,302 A | | 11/1999 | Ure |
| 6,323,445 B1 | * | 11/2001 | Yee ................... 200/5 A |
| 6,417,787 B1 | * | 7/2002 | Hsu .................. 341/26 |
| 6,992,601 B2 | * | 1/2006 | Chiu et al. .......... 341/22 |
| 7,167,107 B2 | * | 1/2007 | Patino et al. ....... 341/22 |
| 7,330,134 B2 | * | 2/2008 | Chen ................. 341/26 |
| 7,888,610 B2 | * | 2/2011 | Lim .................. 200/5 A |
| 7,986,306 B2 | * | 7/2011 | Eich et al. ......... 345/173 |
| 8,072,429 B2 | * | 12/2011 | Grivna .............. 345/173 |
| 2002/0041270 A1 | * | 4/2002 | Chiu et al. ......... 345/168 |
| 2003/0132922 A1 | | 7/2003 | Philipp |
| 2006/0227115 A1 | | 10/2006 | Fry |
| 2007/0257899 A1 | * | 11/2007 | Ao et al. ........... 345/204 |
| 2007/0285440 A1 | | 12/2007 | MacInnis et al. |
| 2008/0048990 A1 | | 2/2008 | Cho et al. |
| 2008/0150906 A1 | | 6/2008 | Grivna |
| 2008/0309490 A1 | | 12/2008 | Honkanen et al. |
| 2010/0019780 A1 | | 1/2010 | Bulea |

OTHER PUBLICATIONS

Written Opinion, Australian Patent Office, Woden Act 2606, Australia, mailing date Dec. 8, 2009, pp. 5.

(Continued)

*Primary Examiner* — Brian Zimmerman
*Assistant Examiner* — Amine Benlagsir
(74) *Attorney, Agent, or Firm* — Hogan Lovells US LLP

(57) ABSTRACT

Aspects of the invention relate to a method and apparatus for scanning an array of sensors. More particularly, the invention is directed towards scanning an array of sensors to accurately determine actuated sensors on a contact-sensitive surface. In one embodiment, three sets of sensing lines can be incorporated into the sensing area for ghost-free detection of up to two keys. Further in other embodiments, n sets of sensing lines can be incorporated into the sensing area for ghost free detection of up to n−1 keys.

24 Claims, 4 Drawing Sheets

OTHER PUBLICATIONS

Examination Report, Australian Patent Office, app. No. SG 200718899-8, Woden Act 2606, Australia, mailing date Jun. 16, 2011, pp. 5.

2nd Written Opinion, Australian Patent Office, app. No. SG 200718899-8, Woden Act 2606, Australia, mailing date Oct. 6, 2010, pp. 5.

* cited by examiner

SYSTEM AND METHOD OF SCANNING AN ARRAY OF SENSORS

This application claims the benefit of Singapore Patent Application No. 200718899-8, filed on Dec. 19, 2007, which is hereby incorporated by reference for all purposes as if fully set forth herein.

BACKGROUND OF THE INVENTION

1. Field of the Invention

The invention is directed towards a method and apparatus for scanning an array of sensors. More particularly, the invention is directed towards scanning an array of sensors to accurately determine actuated sensors on a contact-sensitive surface.

2. Discussion of the Related Art

There are a number of problems with accurately determining the location of an actuated sensor on a contact-sensitive surface. In particular, one problem may be entitled a ghost key problem. A ghost key problem is a problem of inaccurately detecting the actual location of contact with a contact-sensitive surface. For instance, the problem of ghost keys may occur when a location, say location X on a contact-sensitive surface is the actual location of contact with the contact-sensitive area and yet other locations different from location X are determined to have been contacted on the contact-surface area. There are a number of causes of the ghost key problem as known in the art.

SUMMARY OF THE INVENTION

Accordingly, the invention is directed to a system and method for scanning an array of sensors that substantially obviates one or more of the problems due to limitations and disadvantages of the related art.

An advantage of the invention is to provide a method and apparatus that enables actuation of a sensor on a contact-sensitive surface.

Another advantage of the invention is to provide a method and apparatus that substantially eliminates a ghost key problem on a contact-sensitive surface.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied a method of scanning an array of sensors includes the steps of scanning a first set of sensing lines. At least one of the sensing lines in the first set is coupled with a plurality of sensors in an x-axis direction of the array. The method also includes scanning a second set of sensing lines. At least one of the sensing lines of the second set is coupled with a plurality of sensors in a y-axis direction of the array. Scanning a third set of sensing lines and at least one of the lines of the third set, is coupled with a plurality of sensors in a third direction of the array different from the x-axis and y-axis direction. The method is configured to determine a location of the sensor that has been actuated.

In another aspect of the invention, an array of sensors includes a first, second and third set of sensing lines. The sensing lines of the first set include a plurality of sensors of the array along a first direction of the array. The sensing lines of the second set include a plurality of sensors of the array along a second direction of the array. The sensing lines of the third set include a plurality of the sensors in a third direction of the array.

In yet another aspect of the invention, an apparatus is configured to reduce inaccuracy in detecting actuated sensors on a contact-sensitive surface. The apparatus includes a plurality of sensor lines where each of the plurality of sensor lines include a plurality of sensors. Also, the apparatus includes a plurality of controller pins coupled to the plurality of the sensor lines. A line decoder unit is coupled to the plurality of controller pins. The line decoder is configured to determine the actuated sensors of at least one sensor in the array of sensors. A candidate generating unit is coupled to the line decoder and is configured to generate a list of possible candidates of the actuated sensors. The list of possible candidates of the actuated sensors includes the actuated sensors and ghost sensors. Also, the apparatus includes a validity checker unit that is coupled to the candidate generator. The candidate generator is configured to validate the list of possible candidates by removing ghost sensors. Also, the validity checker unit is capable of outputting an output signal including the actuated sensors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Embodiments of the invention describe a method and an apparatus having additional sensing lines, in part to resolve the problem of ghost keys in capacitive matrix scanning. In one embodiment, three sets of sensing lines can be incorporated into the sensing area for ghost-free detection of up to two keys. Further in other embodiments, n sets of sensing lines can be incorporated into the sensing area for ghost free detection of up to n−1 keys.

Some portions of the description which follows are explicitly or implicitly presented in terms of algorithms and functional or symbolic representations of operations on data within an electronic storage device. These algorithmic descriptions and functional or symbolic representations are the means to convey effectively the substance of a body of work. An algorithm is here, and generally, conceived to be a self-consistent sequence of steps leading to a desired result.

The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "processing", "calculating", "determining", "generating", "outputting", or the like, refer to the actions and processes of an electronic system such as a computing system or similar electronic device, that manipulates and transforms data represented as physical quantities within the electronic system into other data similarly represented as physical quantities within the electronic system or other information storage, transmission or display devices.

Figure 1:
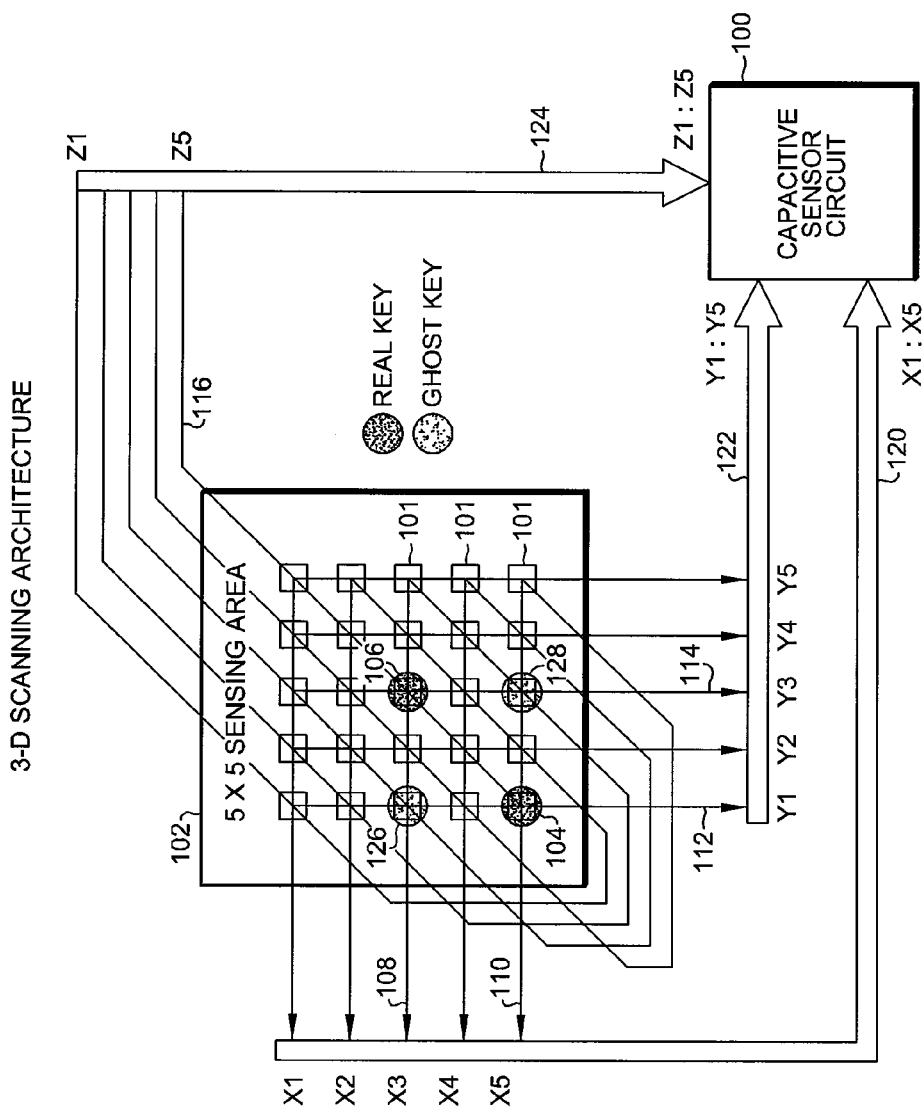
FIG. 1 is a schematic diagram illustrating a scanning architecture for an array of sensors with a third axis of scanning according to an embodiment of the invention.

Reference will now be made in detail to embodiments of the invention, examples of which are illustrated in the accompanying drawings. FIG. 1 is a schematic diagram illustrating a scanning architecture for an array of sensors with a third axis of scanning according to an embodiment of the invention. Referring now to FIG. 1 illustrating a key array with three sets of scanning lines 120, 122 and 124. A sensing area 102 having 25 keys or sensors 101 arranged in a 5×5 array, of course any size array may be utilized as described herein. The keys or sensors include electrical or mechanical keys as known in the art. For example, in a preferred embodiment the keys or sensors may include capacitive sensors or mechanical switch type keys.

The sensors 101 in the sensing area 102 are connected to a sensor circuit 100, such as a capacitive sensor circuit with the three sets of sensing lines 120, 122 and 124. The sensor circuit 100 can determine which keys or sensors have touched based on the signals transmitted by sensing lines 120, 122 and 124.

In addition, the three sets of sensing lines 120, 122 and 124 are configured to provide signals to the sensor circuit 100 such that the sensor circuit 100 can determine the exact contact location or locations on the contact-sensitive surface area or the sensing area 102. By way of example, when keys or sensors 104 and 106 are touched, sensor lines 108, 110, 112, and 114 of the first and second sets of sensing lines 120 and 122 respectively relay a signal to the sensor circuit 100. In a preferred embodiment, the signal is an increased capacitance from a sensor to the sensor circuit 100. In addition, sensor line 116 of the third set of the sensing lines 124 also relays a signal, e.g., an increased capacitance, to the sensor circuit 100.

Figure 2:
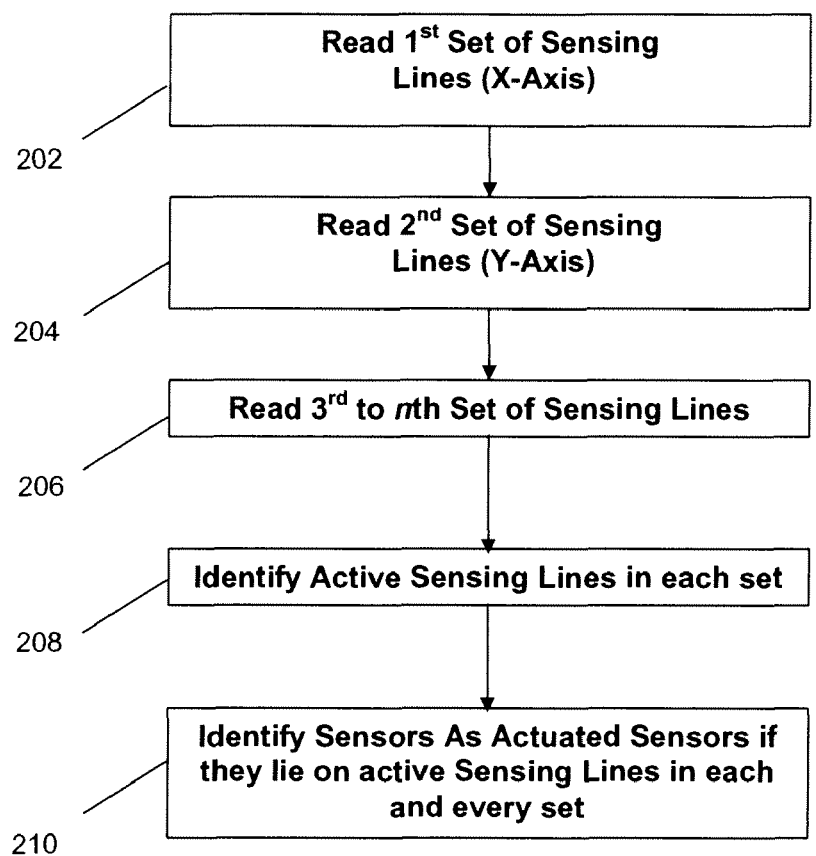
FIG. 2 is a flowchart illustrating an algorithm used by a capacitive sensor circuit to determine the validity of keys according to another embodiment of the invention.

FIG. 2 is a flowchart illustrating an algorithm used by a capacitive sensor circuit to determine the validity of keys according to anther embodiment of the invention.

In this embodiment, the sensor circuit 100 scans the sensing area 102 via received signals on the three sets of sensing lines 120, 122, 124, and processes this information. The sensor circuit 100 determines which sensors or keys have been actuated by means of an example algorithm as shown in FIG. 2. In the algorithm, the sensor circuit reads all sets of sensor lines 120, 122, 124, either individually, together or in any combination (steps 202, 204, and 206). The algorithm identifies the sensing lines which have been activated by a change in signal output, e.g., an increased capacitance (step 208). The sensors or keys that are coupled with an active sensing line from the three sets of sensing lines are identified and determined as keys that have been actuated (step 210).

Referring now to FIG. 1, the sensor circuit 100 discloses an apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of a more specialized apparatus to perform the required method steps may be appropriate.

In this embodiment, the sensor circuit 100 may also be implemented as one or more hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

By way of example, in this embodiment the sensor circuit 100 determines that only keys or sensors 104 and 106 are actuated because only keys or sensors 104 and 106 are coupled with activated sensing lines on the first, second and third set of sensing lines 120, 122 and 124. The number of sensing lines in the sensing area is related to the number of control pins with respect to the sensor circuit 100. For instance, an X by Y array of capacitive keys or sensors can have the following number of controller pin-count by equation:

$$\text{Controller Pin-Count} = (X+Y) + \text{Max}(X, Y)$$

where X is the number of sensors on one sensor line in an x-axis direction, Y is the number of sensors on one sensor line in a y-axis direction, and Max(X,Y) is the greater of X or Y value.

By way of illustration, an X by Y array of capacitive keys or sensors is an 8×8 array sensing area. The controller pin-count is determined as follows:

$$(8+8) + \text{Max}(8,8) = (8+8+8) = 24 \text{ controller pins}$$

In other embodiments additional sets of sensing lines can be incorporated into the sensing area. That is, a fourth set of sensing lines could also be implemented for detecting accurate actuation of 3 keys or sensors. Thus, for the detection of the actuation of up to (n−1) keys, n sets of sensing lines can be used. Each sensing line of the nth set comprises keys of the array which do not share sensing lines of the first 1 to (n−1)th set. For each additional set of sensing lines, N, beyond the x and y-axis, the controller pin-count will be determined by equation:

$$\text{Controller Pin-Count} = (X+Y) + N^* \text{Max}(X, Y).$$

where X is the number of sensors on one sensor line in an x-axis direction, Y is the number of sensors on one sensor line in a y-axis direction, Max(X,Y) is the greater of X or Y value, and N is the number of additional sensing lines not including the x-axis or y-axis.

By way of illustration, an X by Y array of capacitive keys or sensors is an 8×8 array sensing area to achieve ghost-free detection of up to 3 keys in an 8×8 sensing area is utilized. The controller pin count is calculated as follows:

$$(8+8) + 2^*(8) = 32 \text{ controller pins.}$$

Figure 3:
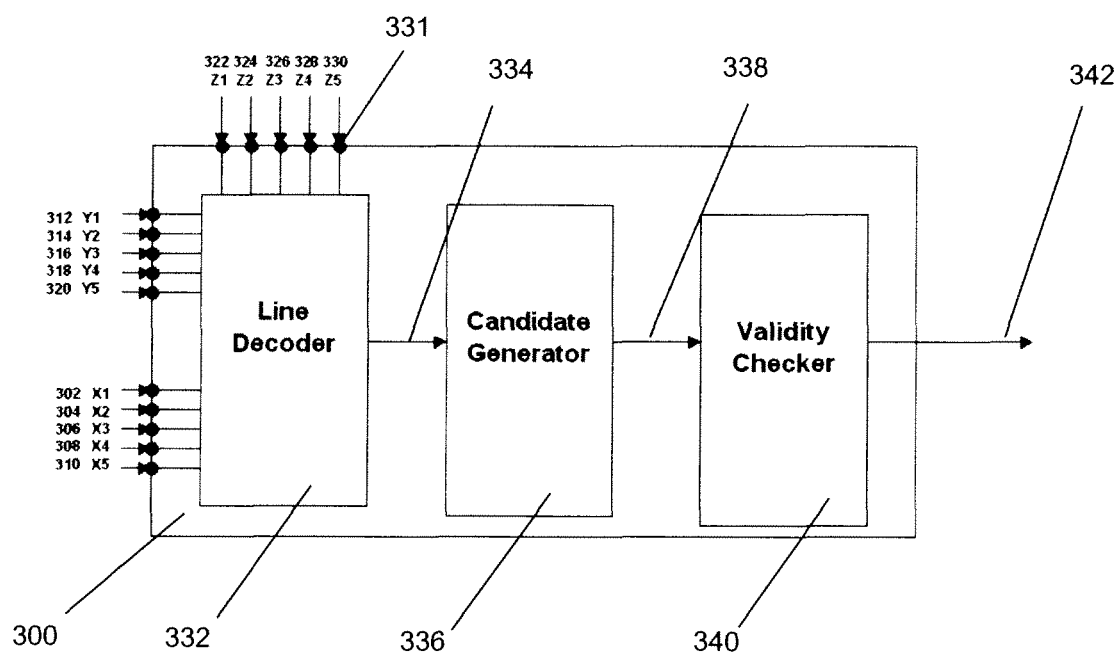
FIG. 3 is a schematic diagram illustrating a capacitive sensor circuit according to another embodiment of the invention.

FIG. 3 is a schematic diagram illustrating a capacitive sensor circuit according to another embodiment of the invention.

Referring to FIG. 3, a capacitive sensor circuit 300 includes 15 sensing lines 302 to 330. The sensing lines 302 to 330 are input into the capacitive sensor circuit 300 at respective controller pins, e.g. 331, and fed into a line decoder 332. In this embodiment, the 15 sensing lines 302 to 330 include three different sets of five sensing lines, each set comprising sensing lines from an axis of scanning. The line decoder 332 decodes capacitive changes in the sensing lines in each of the three sets to determine which sensing lines have been activated. The sensing lines decoded as activated 334 are sent to a candidate generator 336 which generates a list of possible candidates of actuated keys or sensors 338. Each candidate comprises one activated sensing line from each of the three different sets. Candidates are generated until all possible combinations are exhausted to form the list of possible candidates 338.

By way of illustration, referring to FIG. 1, keys 104 and 106 are actuated. Sensing lines X3, X5, Y1, Y3 and Z5 are decoded by the line decoder 332 as activated by the actuation. Using this information, the candidate generator 336 generates the list of possible candidates of actuated keys or sensors 338, as follows:

1. (X3, Y1); Z5
2. (X3, Y3); Z5
3. (X5, Y1); Z5
4. (X5, Y3); Z5.

The candidates are represented as an (X, Y) coordinate set based on the X axis and Y axis of scanning and a further check value based on the Z axis of scanning. Also, it is observed that four candidates are generated despite only two keys or sensors being actuated. In this illustration, candidates 1 and 4 corresponding to sensors 126 and 128, respectively, are ghost keys. These ghost keys provide inaccurate information and should be eliminated from the apparatus and method of the invention.

Referring again to FIG. 3, the four candidates 1 to 4 are sent to a validity checker unit 340. The validity checker unit 340 is configured to verify the validity of the candidates. In one embodiment, the validity checker unit 340 utilizes a look up table (not shown) to verify the validity of the candidates. The look up table will reveal that (X3, Y1) of candidate 1 corresponds with a check value Z3 instead of Z5. Therefore, candidate 1 will be deemed invalid and discarded as a ghost key. Similarly, because (X5, Y3) corresponds with the check value Z3 instead of Z5, candidate 4 is also discarded as a ghost key. Finally, the validity checker 340 outputs the remaining candidates comprising of candidate 2 (X3, Y3) and candidate 3 (X5, Y1) as the actuated keys or sensors 342. It should be appreciated by a person skilled in the art that should additional dimensions of scanning be used for ghost free detection of three or more keys, there will be additional check values for validating the generated candidates.

Figure 4:
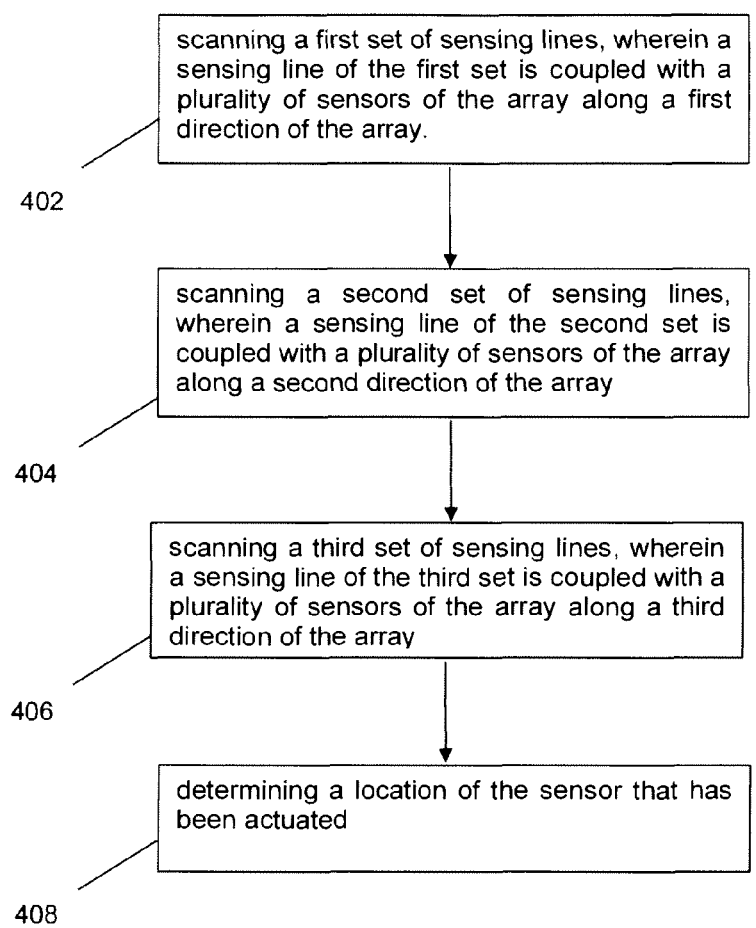
FIG. 4 is a flowchart illustrating a method of scanning an array of sensors.

FIG. 4 is a flowchart illustrating a method of scanning an array of sensors.

Referring to FIG. 4, the flowchart is generally depicted as reference number 400. During the scanning, step 402, a first set of sensing lines is scanned, wherein a sensing line of the first set is coupled with a plurality of keys or sensors of the array along a first direction of the array. At step 404, a second set of sensing lines is scanned, wherein a sensing line of the second set is coupled with a plurality of keys or sensors of the array along a second direction of the array. At step 406, a third set of sensing lines is scanned, wherein a sensing line of the third set is coupled with a plurality of the keys or sensors along a third direction of the array. At step 408, the location of the keys or sensors on the sensing area which have been actuated are determined.

Embodiments of the invention may also be extended with other types of sensors, such as, mechanical switches where the keys or sensors as described comprise of mechanical switch type keys. It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive and modifications and variations of this invention provided they come within the scope of the appended claims and their equivalents.

What is claimed is:

1. A method of scanning an array of sensors, comprising the steps of:
    scanning a first set of sensing lines, wherein a sensing line of the first set is coupled with a plurality of sensors in an x-axis direction of the array;
    scanning a second set of sensing lines, wherein a sensing line of the second set is coupled with a plurality of sensors in a y-axis direction of the array;
    scanning a third set of sensing lines, wherein a sensing line of the third set is coupled with a plurality of sensors in a third direction of the array different from the x-axis and y-axis direction;
    determining a location of the sensor that has been actuated; and
    providing a plurality of controller pins coupled to the sensing lines, wherein a number of the plurality of controller pins equals $(X+Y)+Max(X,Y)$, wherein X is the number of sensors in an x-axis direction of the plurality of sensors, wherein Y is the number of sensors in a y-axis direction, wherein $Max(X,Y)$ is a greater of X or Y.

2. The method of claim 1, wherein the sensing line of the third set comprises sensors of the array which do not share sensing lines of the first and the second set.

3. The method of claim 1, further comprising the steps of:
    scanning a fourth set of sensing line, wherein a sensing line of the fourth set of sensing lines is coupled with a plurality of sensors of the array along another direction of the array.

4. The method of claim 3, wherein the sensing line of the fourth set comprises keys of the array which do not share sensing lines of the first to third set.

5. The method of claim 1, wherein the sensors comprise capacitive sensors.

6. The method of claim 1, wherein the sensors comprise mechanical switch type keys.

7. An array of sensors, comprising:
    a first set of sensing lines, wherein a sensing line of the first set comprises a plurality of sensors of the array along a first direction of the array;
    a second set of sensing lines, wherein a sensing line of the second set comprises a plurality of sensors of the array along a second direction of the array;
    a third set of sensing lines, wherein a sensing line of the third set comprises a plurality of the sensors of the array along a third direction of the array; and
    a plurality of controller pins coupled to the sensing lines, wherein a number of the plurality of controller pins equals $(X+Y)+Max(X,Y)$, wherein X is the number of sensors in an x-axis direction of the plurality of sensors, wherein Y is the number of sensors in a y-axis direction, wherein $Max(X,Y)$ is a greater of X or Y.

8. The array of claim 7, wherein the sensing line of the third set comprises sensors of the array which do not share sensing lines of the first and the second set.

9. The array of claim 7, further comprising:
a sensor circuit coupled to the first, second and third set of sensing lines configured to determine accurately whether a sensor has been detected.

10. The array of claim 9, wherein the sensor circuit comprises:
a line decoder unit coupled to the plurality of controller pins, wherein the line decoder is configured to determine actuated sensors of at least one sensor in the array of sensors;
a candidate generator unit coupled to the line decoder configured to generate a list of possible candidates of actuated sensors, wherein the list of possible candidates of actuated sensors includes the actuated sensors and ghost sensors; and
a validity checker unit coupled to the candidate generator unit configured to validate the list of possible candidates by removing ghost sensors, wherein the validity checker unit is capable of outputting an output signal including the actuated sensors.

11. The array of claim 7, wherein the sensors comprise capacitive sensors.

12. The array of claim 7, wherein the sensors comprise mechanical switch type keys.

13. An apparatus to reduce inaccuracy in detecting actuated sensors on a contact-sensitive surface, comprising:
a plurality of sensor lines, wherein each of the plurality of sensor lines comprise a plurality of sensors;
a plurality of controller pins coupled to the plurality of the sensor lines;
a line decoder unit coupled to the plurality of controller pins, wherein the line decoder is configured to determine the actuated sensors of at least one sensor in the array of sensors;
a candidate generate unit coupled to the line decoder configured to generate a list of possible candidates of the actuated sensors, wherein the list of possible candidates of the actuated sensors includes the actuated sensors and ghost sensors; and
a validity checker unit coupled to the candidate generator configured to validate the list of possible candidates by removing ghost sensors, wherein the validity checker unit is capable of outputting an output signal including the actuated sensors,
wherein a number of the plurality of controller pins equals $(X+Y)+Max(X,Y)$, wherein X is the number of sensors in an x-axis direction of the plurality of sensors, wherein Y is the number of sensors in a y-axis direction, wherein $Max(X,Y)$ is a greater of X or Y.

14. The apparatus of claim 13, wherein the sensors comprise capacitive sensors.

15. The apparatus of claim 13, wherein the sensors comprise mechanical switch type keys.

16. The apparatus of claim 13, wherein the contact sensitive surface is a liquid crystal display.

17. The apparatus of claim 13, wherein the contact sensitive surface is plasma display.

18. The apparatus of claim 13, wherein the line decoder unit is implemented as at least one hardware module.

19. An apparatus to reduce inaccuracy in detecting actuated sensors on a contact-sensitive surface, comprising:
a plurality of sensor lines, wherein each of the plurality of sensor lines comprise a plurality of sensors;
a plurality of controller pins coupled to the plurality of the sensor lines;
a line decoder unit coupled to the plurality of controller pins, wherein the line decoder is configured to determine the actuated sensors of at least one sensor in the array of sensors;
a candidate generator unit coupled to the line decoder configured to generate a list of possible candidates of the actuated sensors, wherein the list of possible candidates of the actuated sensors includes the actuated sensors and ghost sensors; and
a validity checker unit coupled to the candidate generator unit configured to validate the list of possible candidates by removing ghost sensors, wherein the validity checker unit is capable of outputting an output signal including the actuated sensors,
wherein a number of the plurality of controller pins equals $(X+Y)+N*Max(X,Y)$, wherein X is the number of sensors in an x-axis direction of the plurality of sensors, wherein Y is the number of sensors in a y-axis direction, wherein $Max(X,Y)$ is a greater of X or Y, wherein N is a number of additional sensing lines not including the sensors in the x-axis or y-axis direction.

20. The apparatus of claim 19, wherein the sensors comprise capacitive sensors.

21. The apparatus of claim 19, wherein the sensors comprise mechanical switch type keys.

22. The apparatus of claim 19, wherein the contact sensitive surface is a liquid crystal display.

23. The apparatus of claim 19, wherein the contact sensitive surface is a plasma display.

24. The apparatus of claim 19, wherein the line decoder unit is implemented as at least one hardware module.

* * * * *

UNITED STATES PATENT AND TRADEMARK OFFICE
CERTIFICATE OF CORRECTION

PATENT NO. : 8,284,080 B2
APPLICATION NO. : 12/340030
DATED : October 9, 2012
INVENTOR(S) : Chee Yu Ng et al.

Page 1 of 1

It is certified that error appears in the above-identified patent and that said Letters Patent is hereby corrected as shown below:

Column 6, line 63, "v-axis" should be --y-axis--

Signed and Sealed this
Eighteenth Day of December, 2012

David J. Kappos
*Director of the United States Patent and Trademark Office*